US012130370B2

(12) United States Patent
Lee et al.

(10) Patent No.: US 12,130,370 B2
(45) Date of Patent: Oct. 29, 2024

(54) METHOD FOR MEASURING DISTANCE IN WIRELESS COMMUNICATION SYSTEM AND DEVICE THEREFOR

(71) Applicant: LG ELECTRONICS INC., Seoul (KR)

(72) Inventors: Sangrim Lee, Seoul (KR); Hanbyul Seo, Seoul (KR); Sukhyon Yoon, Seoul (KR); Hojae Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 828 days.

(21) Appl. No.: 17/053,024

(22) PCT Filed: Jul. 3, 2018

(86) PCT No.: PCT/KR2018/007498
§ 371 (c)(1),
(2) Date: Nov. 4, 2020

(87) PCT Pub. No.: WO2020/009250
PCT Pub. Date: Jan. 9, 2020

(65) Prior Publication Data
US 2021/0239784 A1 Aug. 5, 2021

(51) Int. Cl.
*H04B 17/00* (2015.01)
*G01S 5/02* (2010.01)
(Continued)

(52) U.S. Cl.
CPC .............. *G01S 5/0246* (2020.05); *G01S 5/06* (2013.01); *H04L 5/0005* (2013.01);
(Continued)

(58) Field of Classification Search
CPC ....... G01S 5/0246; G01S 5/06; H04L 5/0005; H04W 56/005; H04W 64/006
See application file for complete search history.

(56) References Cited

U.S. PATENT DOCUMENTS

2012/0122485 A1* 5/2012 Bartlett ................ G01S 5/0284
  455/456.1
2012/0280865 A1* 11/2012 Gardner ................ G01S 5/021
  342/463

(Continued)

FOREIGN PATENT DOCUMENTS

JP 2008304192 A 12/2008
JP 2009156694 A 7/2009
(Continued)

*Primary Examiner* — Jinsong Hu
*Assistant Examiner* — Farideh Madani
(74) *Attorney, Agent, or Firm* — BRYAN CAVE LEIGHTON PAISNER LLP

(57) ABSTRACT

A method for a first wireless device receiving a reference signal for measuring a distance in a wireless communication system, according to one embodiment of the present invention, may comprise the steps of: receiving, from a second wireless device, a first reference signal comprising a first sinusoidal signal having a first angular frequency and a first initial phase value, and a second sinusoidal signal having a second angular frequency and a second initial phase value; acquiring the phase difference between the first sinusoidal signal and the second sinusoidal signal on the basis of a fast Fourier transform (FFT) performed on the first reference signal; correcting the phase difference on the basis of the first initial phase value and the second initial phase value; and transmitting, to the second wireless device, a second reference signal for measuring a distance, and a third reference signal representing information on the corrected phase difference.

13 Claims, 10 Drawing Sheets

(51) Int. Cl.
   *G01S 5/06*   (2006.01)
   *H04L 5/00*   (2006.01)
   *H04L 27/26*  (2006.01)
   *H04W 56/00*  (2009.01)
   *H04W 64/00*  (2009.01)

(52) U.S. Cl.
   CPC ..... *H04W 56/005* (2013.01); *H04W 56/0065* (2013.01); *H04W 64/006* (2013.01)

(56) References Cited

U.S. PATENT DOCUMENTS

2016/0380487 A1* 12/2016 Widmer ............... H04B 5/0087
                                                   324/654
2017/0089738 A1*  3/2017 Cook ................. G01D 5/34776
2018/0017671 A1*  1/2018 Warke .................... G01S 13/08

FOREIGN PATENT DOCUMENTS

| JP | 2018004539 A | 1/2018 |
| KR | 101227427 B1 | 1/2013 |
| KR | 1020150027461 A | 3/2015 |

\* cited by examiner

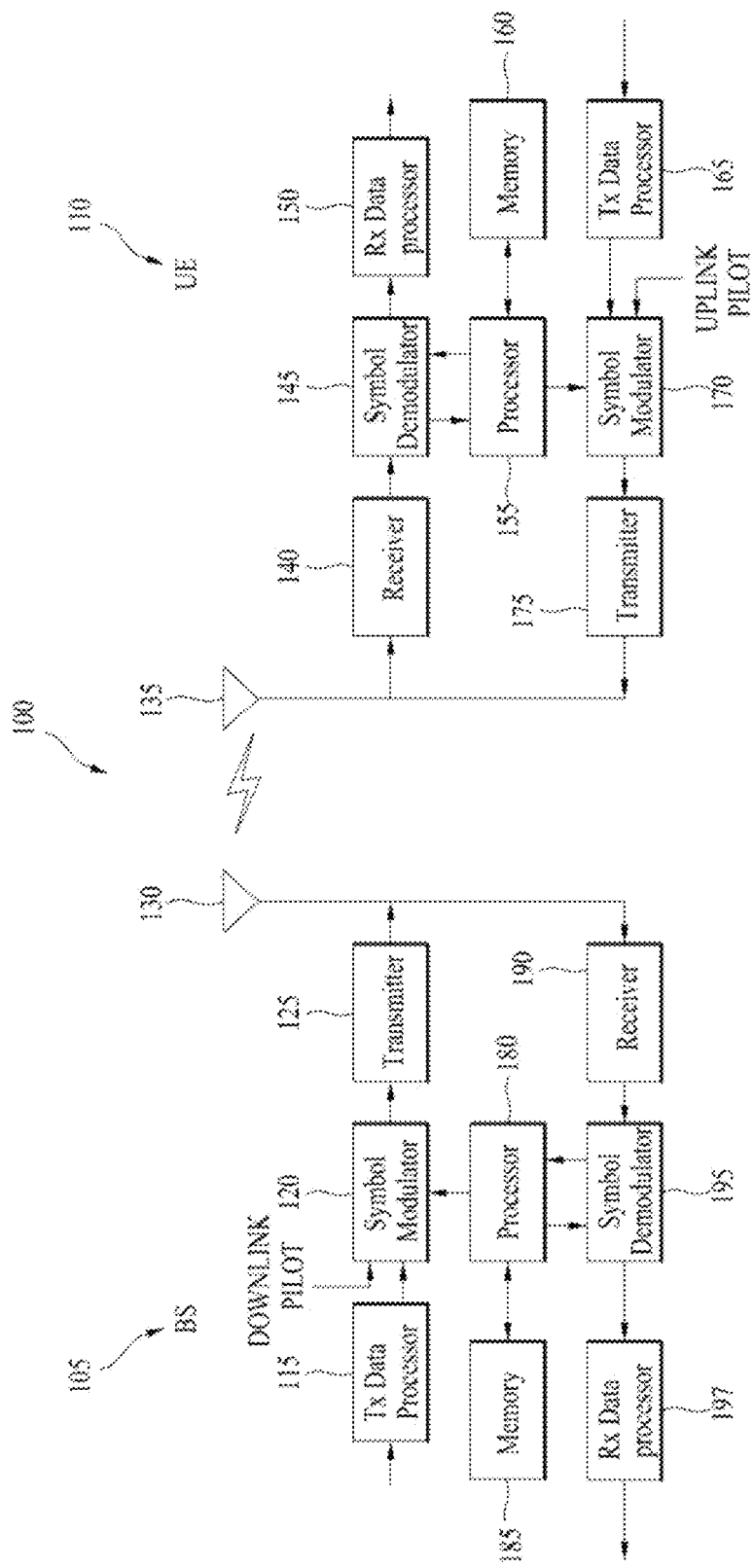

METHOD FOR MEASURING DISTANCE IN WIRELESS COMMUNICATION SYSTEM AND DEVICE THEREFOR

This application is a National Stage Entry of International Application No. PCT/KR2018/007498 filed Jul. 3, 2018, which is hereby incorporated by reference in its entirety for all purposes as if fully set forth herein.

TECHNICAL FIELD

The present disclosure relates to distance measurement in a wireless communication system and, more particularly, to a method of measuring a distance based on transmission and reception of a reference signal and device therefor.

BACKGROUND ART

First, the existing 3rd generation partnership project long term evolution (3GPP LTE)/long term evolution-advanced (LTE-A) system will be briefly described. Referring to FIG. 1, a user equipment (UE) performs an initial cell search (S101). In the initial cell search process, the UE receives a primary synchronization channel (P-SCH) and a secondary synchronization channel (S-SCH) from a base station (BS), performs downlink synchronization with the BS, and acquires information such as a cell identifier (ID). Thereafter, the UE acquires system information (e.g., master information block (MIB)) through a physical broadcast channel (PBCH). The UE can receive the downlink (DL) reference signal (RS) and check the downlink channel status.

After the initial cell search, the UE can acquire more detailed system information (e.g., system information blocks (SIBs)) by receiving a Physical Downlink Control Channel (PDCCH) and a physical downlink control channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCC/PDSCH reception (S107) and physical uplink shared channel (PUSCH)/physical uplink control channel (PUCCH) transmission (S108) as a general uplink/downlink signal transmission procedure. The UE can transmit uplink control information (UCI) to the BS. The UCI may include hybrid automatic repeat request acknowledgment/negative acknowledgment (HARQ ACK/NACK), scheduling request (SR), channel quality indicator (CQI), precoding matrix indicator (PMI) and/or rank indicator (RI), etc.

DISCLOSURE

Technical Problem

The object of the present disclosure is to provide a method and device for measuring distances between a plurality of wireless devices accurately and efficiently based on phase differences between reference signals transmitted and received by the plurality of wireless devices.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method of receiving a reference signal for distance measurement by a first wireless device in a wireless communication system is provided. The method may include: receiving a first reference signal including a first sinusoidal signal and a second sinusoidal signal from a second wireless device, wherein the first sinusoidal signal has a first angular frequency and a first initial phase value, and wherein the second sinusoidal signal has a second angular frequency and a second initial phase value; obtaining a phase difference between the first and second sinusoidal signals based on a fast Fourier transform (FFT) of the first reference signal; correcting the phase difference based on the first and second initial phase values; and transmitting a second reference signal for distance measurement and a third reference signal including information about the corrected phase difference to the second wireless device.

In another aspect of the present disclosure, a first wireless device for receiving a reference signal for distance measurement in a wireless communication system is provided. The first wireless device may include: a transceiver; and a processor. The processor may be configured to: control the transceiver to receive a first reference signal including a first sinusoidal signal and a second sinusoidal signal from a second wireless device, wherein the first sinusoidal signal has a first angular frequency and a first initial phase value, and wherein the second sinusoidal signal has a second angular frequency and a second initial phase value; obtain a phase difference between the first and second sinusoidal signals based on a fast Fourier transform (FFT) of the first reference signal; correct the phase difference based on the first and second initial phase values; and transmit a second reference signal for distance measurement and a third reference signal including information about the corrected phase difference to the second wireless device.

In a further aspect of the present disclosure, a method of transmitting a reference signal for distance measurement to a first wireless device by a second wireless device in a wireless communication system is provided. The method may include: transmitting a first reference signal including a first sinusoidal signal and a second sinusoidal signal to the first wireless device, wherein the first sinusoidal signal has a first angular frequency and a first initial phase value, and wherein the second sinusoidal signal has a second angular frequency and a second initial phase value; receiving a second reference signal for distance measurement and a third reference signal including information about a corrected phase difference from the first wireless device; and estimating a distance between the first and second wireless devices based on the information about the corrected phase difference. The information about the corrected phase difference may indicate a phase difference between the first and second sinusoidal signals corrected by the first wireless device in consideration of the first and second initial phase values after receipt of the first reference signal.

The first and second sinusoidal signals may be $x_1(t)=\alpha_1 * e^{j*(w1*t+\beta1)}$ and $x_2(t)=\alpha_2 * e^{j*(w2*t+\beta2)}$, respectively, where t denotes a time, $\alpha_1$ denotes an amplitude of the first sinusoidal signal, $\alpha_2$ denotes an amplitude of the second sinusoidal signal, $w_1$ denotes the first angular frequency, $w_2$ denotes the second angular frequency, $\beta_1$ denotes the first initial phase value, and $\beta_2$ denotes the second initial phase value.

The phase difference may be calculated according to Equation A.

$$\frac{X_{RX}(w_2)}{X_{RX}(w_1)} = \frac{\alpha_2}{\alpha_1} * e^{j*\{(w_2-w_1)(t_{s,RX}-t_{a,RX})+(\beta_2-\beta_1)\}}$$ [Equation A]

In Equation A, $t_{s,RX}$ denotes a time at which the FFT of the first reference signal starts, $t_{a,RX}$ denotes a time at which the first reference signal arrives at the first wireless device, $X_{RX}(w_1)$ denotes an FFT result of the first sinusoidal signal, and $X_{RX}(w_2)$ denotes an FFT result of the second sinusoidal signal.

The phase difference calculated according to Equation A may be as follows: $\Psi=(w_2-w_1)(t_{s,RX}-t_{a,RX})+(\beta_2-\beta_1)$, and the corrected phase difference may be as follows: $\theta=\Psi-(\beta_2-\beta_1)$.

A phase of the third reference signal may have an offset as large as the corrected phase difference from a phase of the second reference signal.

The third reference signal may include a sinusoid defined as: $x_{k+2}(t)=\alpha_{k+2}*\exp(j*(2\pi*f_{k+2}*t+\beta_{k+2}+\theta))$, where k+2 denotes an index of a subcarrier on which the sinusoid $x_{k+2}(t)$ is transmitted, t denotes a time, $\alpha_{k+2}$ denotes an amplitude of the sinusoid $x_{k+2}(t)$, $w_{k+2}$ denotes an angular frequency of the sinusoid $x_{k+2}(t)$, and $\beta_{k+2}$ denotes an initial phase value of the sinusoid $x_{k+2}(t)$.

A distance between the first and second wireless devices may be calculated according to Equation B.

$$d = \frac{c}{2}\left(t_{symb} - \frac{\theta}{2\pi*\Delta f} - \text{delta}_2\right)$$ [Equation B]

In Equation B, d denotes the distance between the first and second wireless devices, c denotes a speed of light, $t_{symb}$ denotes one symbol length, $\theta$ denotes the corrected phase difference, $\Delta f$ denotes a subcarrier spacing between the second and third reference signals, and $\text{delta}_2$ denotes a difference between a time at which the second reference signal arrives at the second wireless device and a time at which the FFT is performed on the second reference signal.

In this case, $\text{delta}_2$ may be calculated according to Equation C.

$$\text{delta}_2 = t_{s,Tx} + (n+1)*t\_\text{symb} - t_{a,Tx}$$ [Equation C]

In Equation C, $t_{s,Tx}$ denotes a time at which the first reference signal is transmitted by the second wireless device, $t_{a,Tx}$ denotes the time at which the second reference signal arrives at the second wireless device, and n denotes a number of symbols between the first and second reference signals.

Advantageous Effects

According to the present disclosure, a reception device may measure a phase difference based on a first reference signal and then transmit to a transmission device a third reference signal including the phase difference measured by the reception device together with a second reference signal for distance measure. Thus, the distance between the transmission and reception devices may be estimated even when the transmission and reception devices are not synchronized. In addition, the error range of distance measurement may be further reduced since the phase difference is used instead of using a time difference between reference signals.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 10 is a block diagram illustrating a transmission apparatus and a reception apparatus according to an embodiment of the present disclosure.

BEST MODE

Figure 1:
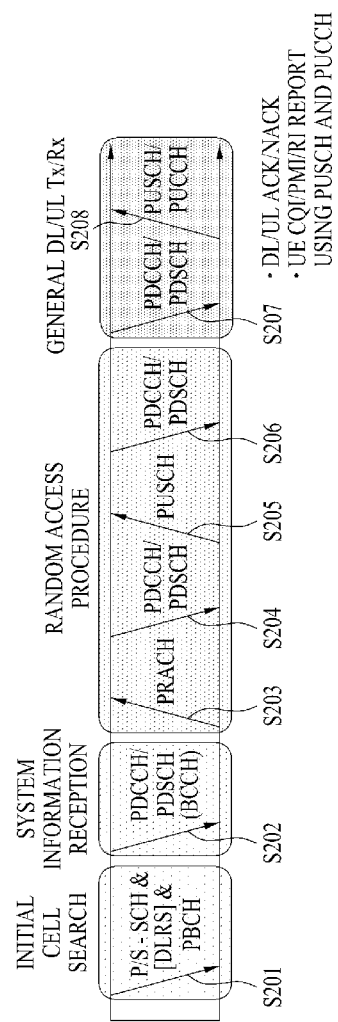
FIG. 1 illustrates physical channels used in a 3rd generation partnership project (3GPP LTE)/long term evolution-advanced (LTE-A) system and a general signal transmission method using the physical channels.

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as global system for mobile communications/general packet radio service/enhanced data rates for GSM evolution (GSM/GPRS/EDGE). OFDMA can be implemented with such a radio technology as IEEE 802.11 (Wi-Fi), IEEE 802.16 (WiMAX), IEEE 802.20, E-UTRA (Evolved UTRA), etc. UTRA is a part of universal mobile telecommunications system (UMTS). 3rd generation partnership project long term evolution (3GPP LTE) is a part of evolved UMTS (E-UMTS) that uses E-UTRA, 3GPP LTE adopts OFDMA in downlink and adopts SC-FDMA in uplink. LTE-advanced (LTE-A) is an evolved version of 3GPP LTE.

For clarity, the following description mainly concerns 3GPP LTE system or 3GPP LTE-A system, by which the technical idea of the present disclosure may be non-limited. Specific terminologies used in the following description are provided to help understand the present disclosure and the use of the terminologies can be modified to a different form within a scope of the technical idea of the present disclosure.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/user equipment (UE) that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Position measurement in a legacy LTE system will first be described briefly.

Position Measurement in LTE Systems

In the LTE system, a location position protocol (LPP) has been introduced. In an LPP model, a location server may transmit assistance data for positioning to a UE. That is, the location server may transmit the assistance data to the UE to enable the UE to use observed time difference of arrival (OTDOA)/assisted global navigation satellite system (A-GNSS). In the LPP model, the UE uses a reference signal (RS) (e.g., positioning RS) for positioning and transmits measurement information or location information from the RS to the location server (e.g., Evolved Serving Mobile Location Center (E-SMLC)/UPL location platform (SLP)), and the location server is responsible for making a final decision on a location. Location information and a method of transmitting and receiving the location information are standardized into the LPP standard, and the LPP standard may include an information element (IE) and a signaling procedure for location information.

The LPP technology largely includes three functions: one of them is A-GNSS, another function is OTDOA, and the other is enhanced cell ID (E-CID).

A-GNSS is a satellite-based positioning scheme, which offers the benefit of shortening an initial positioning time because basic satellite information for positioning is received through a wireless network (e.g., LTE). In the A-GNSS scheme, accurate location information is obtained through communication between a global positioning system (GPS) and a location server of the network.

In OTDOA, a measurement value called a reference signal time difference (RSTD) is used to calculate a propagation time difference between a reference evolved Node B (eNB) and a neighboring eNB. That is, a signal in a specific frame is received from the neighboring eNB, a tap closest in time to a tap received from the neighboring eNB is selected from among delay taps received in the frame from the reference eNB, and the time difference between the taps is calculated as an RSTD value. Therefore, performance may depend on how effective taps are estimated. As such, OTDOA is a scheme in which a UE obtains a distance and a location based on the difference between arrival times of multiple eNB (or cell) signals.

E-CID is a scheme of narrowing the location of a UE by combining a legacy CID scheme and a received signal strength indication (RSSI) scheme into a hybrid scheme. A received signal received power (RSRP) and a received signal received quality (RSRQ) are provided as related measurement values. In the E-CID scheme, the UE estimates a location through round trip measurement, pathloss related measurement, and angle of arrival measurement based on analysis of the RSRP of an LTE OFDMA signal.

[Ranging Estimation Based on Phase & Phase Compensation]

A description will be given of a method of measuring a distance based on the phase of a signal transmitted and received between different wireless devices (e.g., a transmission device and a reception device). In the following description, a wireless device that first transmits a signal is referred to as a transmission device, and a device that first receives a signal is referred to as a reception device. However, the transmission device may also receive a signal, and the reception device may also transmit a signal. That is, the transmission device may also include a transmitter and a receiver, and the reception device may also include a transmitter and a receiver. For example, the transmission device and the reception device may be an eNB and a UE, respectively. In another example, the transmission device and the reception device may be a plurality of eNBs or a plurality of UEs.

A process of estimating the distance between the transmission and reception devices may be referred to as ranging. Since a ranging procedure described herein is for distance estimation, those skilled in the art will understand that the ranging procedure is completely different from a ranging procedure performed for random access or synchronization in an IEEE-based wireless communication system such as WiMAX, in spite of the same appellation.

First, a quantization method based on phase differences and a phase difference compensation method available for ranging estimation based on phase information will be described below.

Since the legacy LTE system employs RSTD, the accuracy of distance measurement is limited by the unit of one symbol length, and there is a constraint that the transmission and reception devices should operate in synchronization. For example, according to the RSTD scheme, the reception device needs to apply time correlation with an RS and detect a time at which the peak appears while moving a window corresponding to N fast Fourier transform (FFT) samples.

On the other hand, according to the phase difference-based ranging estimation scheme, the accuracy of distance measurement is not limited by the unit of one symbol length, and the transmission and reception devices may operate out of synchronization.

While the following examples are on the assumption that signals are transmitted and received in two angular frequencies, the present disclosure is not limited thereto. That is, the present disclosure may be applied when more angular frequencies are used. The term "angular frequency" may refer to an angular velocity. It is assumed in the examples that a plurality of angular frequency components are transmitted simultaneously for the convenience of description. However, when the frequencies are transmitted at predetermined different times, the present disclosure may be implemented by considering transmission time differences.

Further, it is assumed that a time at which the transmission/reception device performs signal transmission/reception is quantized. For example, when the transmission/reception device transmits/receives an OFDM signal, the boundary of each OFDM symbol may be a quantized time at which transmission/reception is performed. It is assumed that the transmission and reception start times of the transmission and reception devices are $t_{s,TX}$ and $t_{s,RX}$, respectively and they are repeated at every $t_{symb}$, where $t_{symb}$ may be the length of an OFDM symbol.

Figure 2:
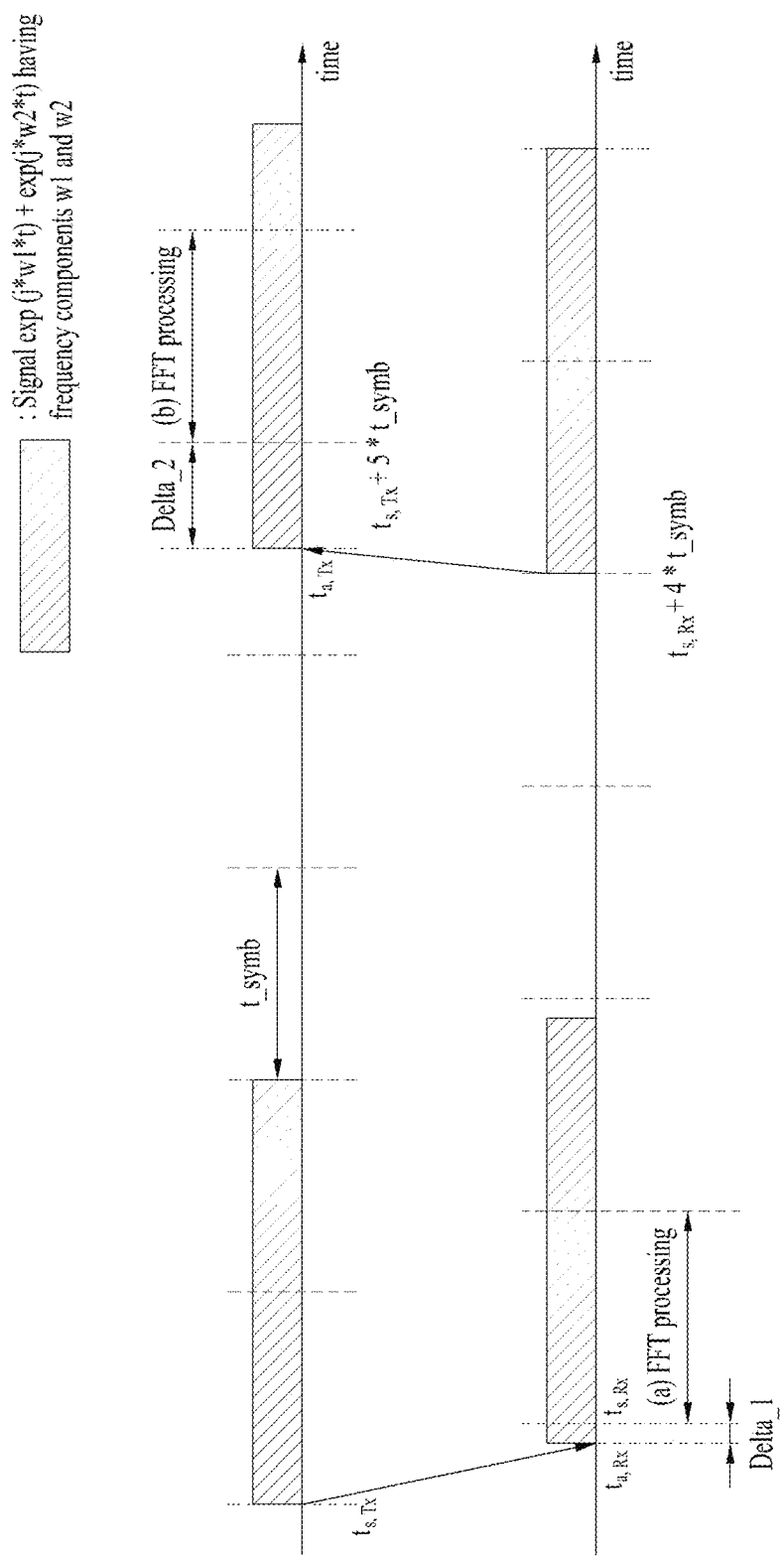
FIG. 2 illustrates a series of processes for measuring the distance between a transmission device and a reception device according to an embodiment of the present disclosure.

FIG. 2 is a flowchart illustrating a series of processes for measuring the distance between a transmission device and a reception device according to an embodiment of the present disclosure. While it is assumed that the reception device has been synchronized with a synchronization signal transmitted by the transmission device, for the convenience of description, distance measurement based on a phase difference may also be applied even when the transmission device and the reception device are asynchronous with each other.

Although for the convenience of description, a signal repeatedly transmitted during two symbols is considered, a signal transmission having a cyclic prefix (CP) and data for one symbol length may also be considered.

First, the transmission device transmits a sine wave (sinusoid) having angular frequencies $w_1$ and $w_2$ as an RS (e.g., ranging RS) for distance measurement at a time $t_{s,Tx}$. For example, an RS for distance measurement at a specific time t may be defined by $RS(t)=\alpha_1 *e^{j*(w1*t+\beta1)}+\alpha_2*e^{j*(w2*t+\beta2)}$. For convenience, a signal transmitted by the transmission device is referred to as a first signal. In this case, the first signal may be understood as the sum of a first sinusoidal component, $x1(t)=\alpha1*ej*(w1*t+\beta1)$, and a second sinusoidal component, $x2(t)=\alpha2*ej*(w2*t+\beta2)$. Here, al denotes the amplitude of the first sinusoidal component, and $\alpha2$ denotes the amplitude of the second sinusoidal component. $\beta1$ denotes the phase of the first sinusoidal component at t=0 (e.g., initial phase value or initial phase offset), and $\beta2$ denotes the phase of the second sinusoidal component at t=0. The values of $\beta_1$ and $\beta_2$ may be predetermined between the transmission and reception devices.

The transmitted first signal is delayed by d/c based on the distance d between the transmission device and the reception device and the speed c of light and arrives at the reception device at a time ta,Rx.

Due to sampling (or quantization), the reception device actually starts to acquire a baseband signal (e.g., sampled values) at the time ta,Rx. If the size of fast Fourier transform (FFT) performed by the reception device is N, the reception device may obtain values corresponding to w1 and w2 by subjecting a total of N sampled values to FFT.

The phase difference between a w1 component, XRX(w1) and a w2 component, XRX(w2) of the FFT sampled values may be obtained by Equation 1.

$$\frac{X_{RX}(w_2)}{X_{RX}(w_1)} = \frac{\alpha_2}{\alpha_1} *e^{j*\{(w_2-w_1)(t_{s,RX}-t_{a,RX})+(\beta_2-\beta_1)\}} \quad \text{[Equation 1]}$$

In Equation 1, the phase difference $\Psi$ is (w2−w1)(ts,RX−ta,RX)+(β2−β1), and the difference between the initial phase values (β2−β1) present since the time of transmission of the first signal should be removed from the phase difference $\Psi$. For example, the reception device may correct the phase difference $\Psi$ to θ using the initial phase values.

As described above, it is assumed that the values of $\beta_1$ and $\beta_2$ in Equation 1 are predetermined between the transmission and reception devices. Thus, the phase difference θ resulting from a difference between an arrival time except $\beta_2-\beta_1$ and an FFT start time is defined as $(w_2-w_1)(t_{s,RX}-t_{a,RX})$. $X_{RX}(w_1)/X_{RX}(w_2)$ is a value that may be calculated from the first signal received by the reception device, and $(w_2-w_1)$ is a predefined value already known to the reception device. Therefore, the reception device may obtain Delta_1=$t_{s,RX}-t_{a,RX}$ from Equation 1. Delta_1 denotes a difference between the start time of OFDM processing at the reception device and the actual arrival time of the first signal at the reception device.

Similarly to the transmission device, the reception device transmits a sinusoid (referred to as a second signal) having the angular frequencies $w_1$ and $w_2$ after n symbols. In FIG. 2, it is assumed that n=4.

Upon receiving the second signal, the transmission device may obtain Delta_2=$t_{s,Tx}$+(n+1)*t_symb−$t_{a,Tx}$ from the corrected phase difference θ after performing the FFT on N sampling values, which are obtained starting from a time $t_{s,Tx}$+(n+1)*t_symb.

Thus, the round trip time (RTT) of a signal is defined as shown in Equation 2.

$$2*d/c=t\_symb-Delta\_2-Delta\_1 \quad \text{[Equation 2]}$$

As described above, c is a fixed constant (i.e., the speed of light). Although the transmission device knows the values of Delta_2 and t_symb, the transmission device may not know the value of Delta_1. Therefore, the transmission device needs to obtain information about Delta_1 measured by the reception device to measure the distance d between the transmission device and reception devices.

Example 1-1. Method of Quantizing and Transmitting Delta 1

For example, the reception device may quantize Delta_1 to transmit the value of Delta_1 to the transmission device. The quantized Delta_1 value may be transmitted by physical layer signaling or higher layer signaling such as radio resource control (RRC) signaling.

It may be seen from Equation 2 that when the phase difference exceeds $2\pi$, ambiguity occurs. For example, the reception device may not distinguish between a phase difference of $2\pi+\alpha$ and a phase difference of $\alpha$.

It is assumed that the quantization level is $2^Q$ (i.e., Q-bit quantization) and the value of Q is known to the transmission and reception devices. Since the value of Q corresponds to a payload size, it needs to be constant regardless of the values of w1 and w2.

Since the range of ambiguity changes depending on the value of w2−w1, a quantization technique and analysis are required.

The maximum value of Delta_1 is $2\pi/(w2-w1)$ within an ambiguity-free range. When the quantization level is $2^Q$, the least significant bit (LSB) (1 bit), i.e., the minimum quantization unit is $2\pi/(w2-w1)/2^Q$.

For example, when w2−w1=$2\pi$*15 kHz, the maximum value of Delta_1 is 66.67 us. If Q is assumed to be 10, the minimum quantization unit is 66.67 us/1024. Thus, when the reception device transmits a binary value of 00 0000 1111 (=15) in payload, the transmission device may calculate Delta_1 to be 66.67 us/1024*15.

In another example, when w2−w1=$2\pi$*60 kHz, the maximum value of Delta_1 is 16.67 us. If the quantization level Q is 8 and the value of payload received by the transmission device is 9, Delta_1 may be calculated to be 16.67 us/256*9.

Example 1-2. Method of Quantizing and Transmitting Phase Difference of Equation 1

In another example, the reception device may quantize and transmit the phase difference of Equation 1. The phase difference may have a value between 0 and $2\pi$.

For example, when Q is assumed to be 10, the minimum quantization unit is $2\pi/1024$. If $w2-w1=15$ kHz$*2\pi$ and the reception device transmits 00 0000 1111 (=15) in payload, the transmission device may obtain a phase difference of $2\pi/1024*15$. The transmission device may calculate Delta_1 to be $2\pi/1024*15/(15k*2\pi)=66.67$ us/$1024*15$.

While the above examples have been described based on the angular frequency, (angular frequency)/$2\pi$ will be referred to as a frequency for convenience of description.

In a new RAT (NR) system discussed in 3GPP, one BS may configure different subcarrier spacings (SCSs) depending on services (e.g., eMBB, URLLC, mMTC). For example, a frequency spacing between two subcarriers may be set to 15 kHz for eMBB, 60 kHz for URLLC, and 2.5 kHz for mMTC.

In the NR system, the transmission and reception devices may operate according to the above-described quantization method. For example, if Q is set to 10 independently of services, an eMBB UE may interpret the RS for distance measurement based on an SCS of 15 kHz, and an mMTC UE may interpret the RS for distance measurement based on an SCS of 2.5 kHz. Then, the value of quantized Delta_1 or phase difference may be transmitted to the network. In other words, for each service, a different SCS may be configured for the RS for distance measurement. Further, a different SCS may be configured for the RS in consideration of requirements depending on the UE class even in the same service.

Both Delta_1 and Delta_2 are values for distance measurement. However, Delta_2 includes a RS phase difference that varies depending on distance. On the other hand, Delta_1 is a value independent of the distance between the transmission and reception devices, and represents the difference between an FFT processing time and a time at which the reception device receives the first signal.

Since the value of Delta_1 affects the distance measurement, Delta_1 may be processed separately from the RS phase difference for Delta_2 measurement. For example, Delta_1 may be obtained from a first RS with a phase difference of 60 kHz, and Delta_2 may be obtained from a second RS with a phase difference of 15 kHz for coverage expansion. For example, an RS with a large value of w2−w1 may be more robust to noise/interference, but an ambiguity-free distance between the transmission and reception devices decreases. On the other hand, if the value of w2−w1 is small, the RS may be suitable for wide coverage since the ambiguity-free distance between the transmission and reception devices increases.

Therefore, the network may set a phase difference to be closest to and greater than the reciprocal of the maximum value of Delta_1.

In Example 1-1/1-2, it has been described how the reception device quantizes and transmits the value of Delta_1 or the phase difference value. However, a number of payload bits may be required to reduce errors in the distance measurement caused by quantization errors. That is, if the minimum quantization unit becomes small to improve the resolution of the distance measurement, the payload size may increase.

To overcome such a disadvantage, a method of directly indicating a phase difference without quantization may be considered in the present disclosure.

Example 2. Method of Transmitting Reference Signal Indicating Phase Different Information According to an embodiment of the present disclosure, the reception device may transmit an RS (e.g., third signal) indicating phase difference information. This method is advantageous in that the transmission device may obtain Delta_1 as a continuous value rather than a quantized value.

Figure 3:
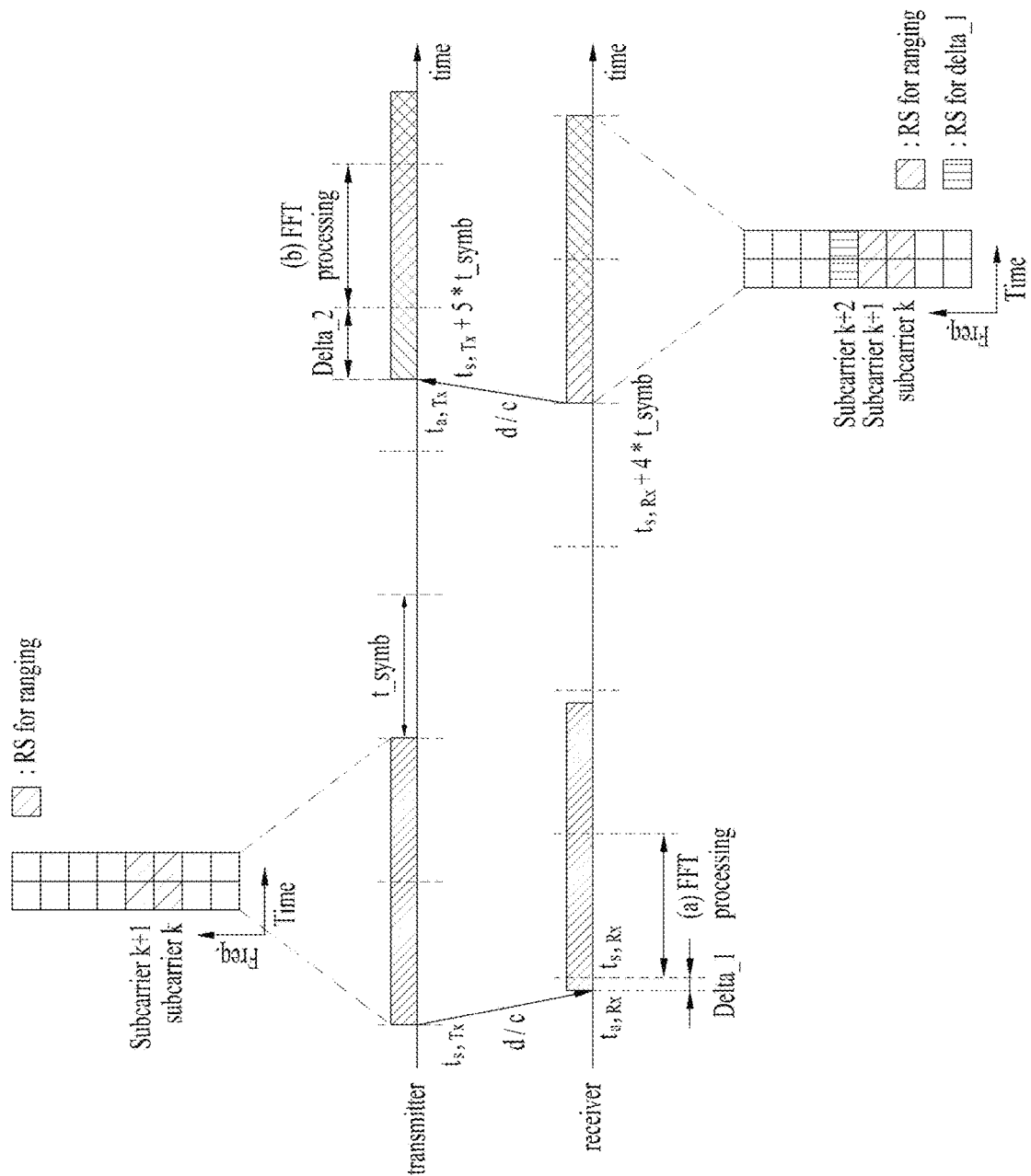
FIG. 3 illustrates transmission of a reference signal for correction of Delta_1 from a reception device according to an embodiment of the present disclosure.

FIG. 3 illustrates transmission of an RS for correction of Delta_1 from the reception device according to an embodiment of the present disclosure.

In FIG. 3, the reception device transmits an additional RS (e.g., third signal) including phase information corresponding to Delta_1, unlike the example of FIG. 2. In FIG. 3, an RS (e.g., third signal) transmitted on subcarrier k+2 may be configured such that the phase difference from an RS (e.g., second signal) transmitted on subcarrier k+1 is equivalent to the phase difference value of Equation 1.

Hereinafter, a process in which the reception device generates and transmits the third signal with a phase value corresponding to Delta_1 will be described in detail. First, it is assumed that the reception device has obtained the corrected phase value θ of Equation 3 according to Equation 1.

$$\theta = 2\pi*(f_2-f_1)(t_{s,RX}-t_{s,RX}) \quad \text{[Equation 3]}$$

In Equation 3, $f_1=w_1/2\pi$ and, $f_2=w_2/2\pi$.

The reception device transmits a sinusoidal signal (e.g., second signal) for distance measurement on subcarriers k and k+1. The sinusoidal signal (e.g., second signal) on subcarriers k and k+1 may be defined as the sum of a sinusoidal component on subcarrier k, $x_k(t)=\alpha_k*\exp(j*(2\pi*f_k*t+\beta_k))$ and a sinusoidal component on subcarrier k+1, $x_{k+1}(t)=\alpha_{k+1}*\exp(j*(2\pi*f_{k+1}*t+\beta_{k+1}))$, similarly to the above-described first signal.

Here, $\alpha_k$ and $\alpha_{k+1}$ denote the amplitude of the sinusoidal component $x_k(t)$ on subcarrier k, and the amplitude of the sinusoidal component $x_{k+1}(t)$ on subcarrier k+1, respectively. $2\pi*f_k$ and $2\pi*f_{k+1}$ denote the angular frequency of $x_k(t)$ and the angular frequency of $x_{k+1}(t)$, respectively. $\beta_k$ and $\beta_{k+1}$ denote the phases (initial phase values or phase offsets) of $x_k(t)$ and $x_{k+1}(t)$ at t=0, respectively.

For convenience of description, it is assumed that the phase of the corresponding RS at t=0 is zero (i.e., $\beta_k=\beta_{k+1}=0$) and the amplitude thereof is 1 (i.e., $\alpha_k=\alpha_{k+1}=1$). Thus, the value transmitted in resource elements (REs) on subcarriers k and k+1 is equal to 1. However, the present disclosure is not limited thereto. That is, the present disclosure is applicable to random magnitudes and phases.

A sinusoidal component on subcarrier k+2 may be defined as: $x_{k+2}(t)=\alpha_{k+2}*\exp(j*(2\pi*f_{k+2}*t+\beta_{k+2}+\theta))$.

Here, $\alpha_{k+2}$ denotes the amplitude of the sinusoidal component $x_{k+2}(t)$ on subcarrier k+2. $2\pi*f_{k+2}$ denotes the angular frequency of $x_{k+2}(t)$. $\beta_{k+2}$ denotes the phase (initial phase value or phase offset) of $x_{k+2}(t)$ at t=0. In addition, θ denotes the phase difference obtained from Equation 3. For convenience of description, it is assumed that $\beta_{k+2}=0$ and $\alpha_{k+2}=1$. However, the present disclosure is not limited thereto. That is, the present disclosure is applicable to random magnitudes and phases.

In addition, the reception device transmits a value of $\exp(j*\theta)$ (e.g., third signal) on the RE corresponding to subcarrier k+2.

The transmission device may perform the FFT from a time $t_{s,Tx}+(n+1)*t\_symb$ (e.g., n=4 in FIG. 3) to measure the phase difference between subcarriers k and k+1 and then obtain Delta_2 therefrom. For example, the transmission device may obtain Delta_2 from the second signal.

The phase difference φ between subcarriers k+1 and k+2 measured by the transmission device based on the third signal may be expressed as shown in Equation 4.

$$\emptyset = (2\pi*\Delta f*\text{delta}_2)+\theta \quad \text{[Equation 4]}$$

In Equation 4, Δf denotes a frequency spacing between subcarriers k+1 and k+2. Δf may be a predefined value already known to the transmission device.

Thus, the transmission device may obtain θ based on Delta_2 obtained from the second signal according to Equation 5.

$$\theta = -(2\pi * \Delta f * \text{delta}_2) + \varnothing \qquad \text{[Equation 5]}$$

The distance d may finally be calculated according to Equation 6.

$$d = \frac{c}{2}\left(t_{symb} - \frac{\theta}{2\pi * \Delta f} - \text{delta}_2\right) \qquad \text{[Equation 6]}$$

FIG. 3 illustrates that the RS (e.g., third signal) for Delta_1 and the RS (e.g., second signal) for ranging are frequency division multiplexed (FDM) on adjacent subcarriers. The reason for this is that arranging the RSs in a bandwidth where channel coherence is ensured is desirable in obtaining an accurate phase difference.

However, according to another example of the present disclosure, the RS for Delta_1 and the RS for ranging may not be adjacent to each other in the frequency domain, or may be time division multiplexed (TDM) on different time resources. The locations of the RSs may be configured by the network.

The network may measure the location of the reception device based on information about the distance between the transmission and reception devices.

Figure 4:
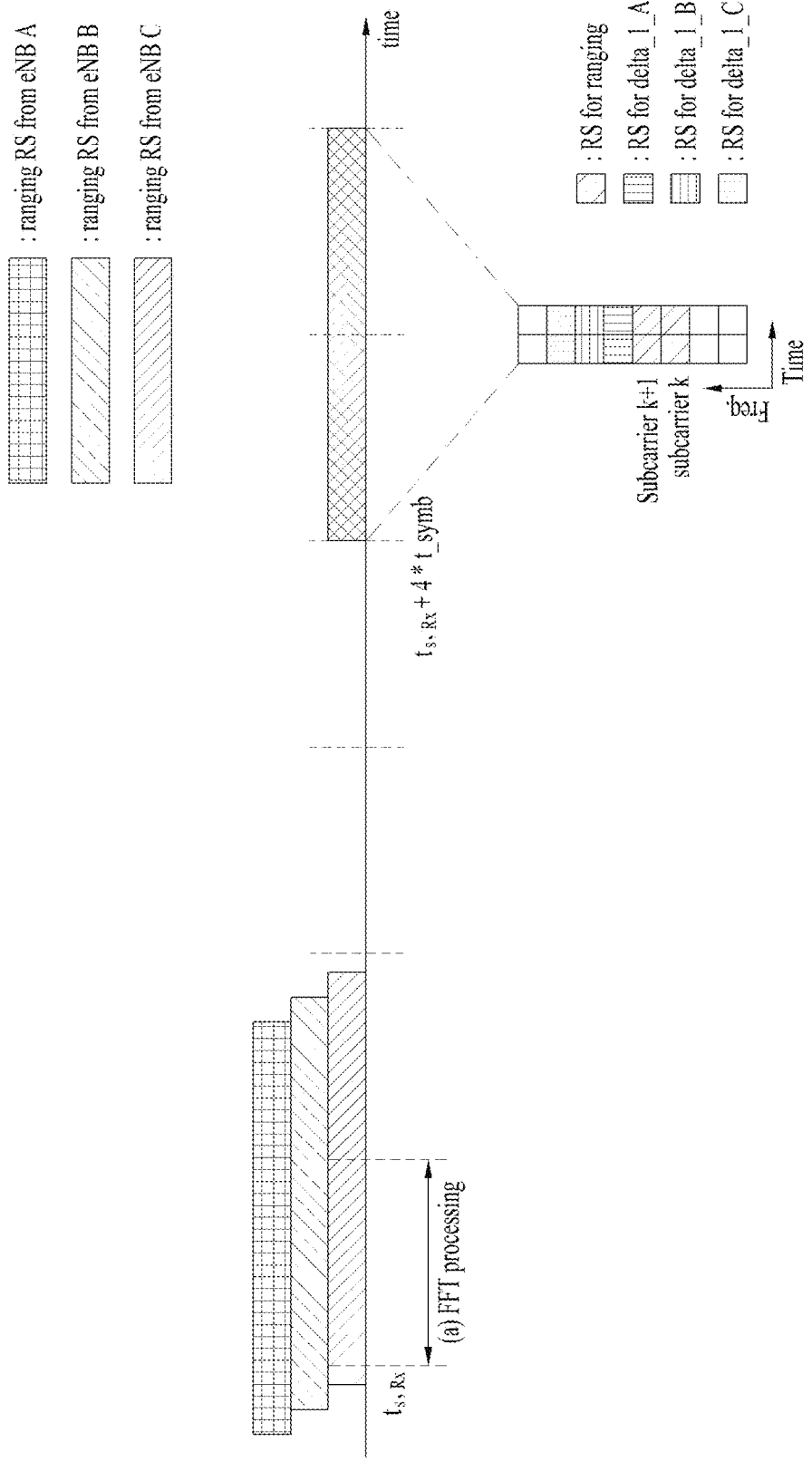
FIG. 4 is a diagram illustrating distance measurement between multiple cells and a user equipment (UE) according to an embodiment of the present disclosure.

Hereinafter, embodiments to which the above distance measurement methods are applied will be described Example of Distance Measurement Between Multiple Cells and UE FIG. 4 is a diagram illustrating distance measurement between multiple cells and a UE according to an embodiment of the present disclosure. It is assumed that the multiple cells transmit RSs (e.g., first signals) for distance measurement and the UE measures the RSs and then transmits an RS (e.g., second signal) and phase difference information (e.g., third signal). It is also assumed that each cell belongs to a different eNB.

Specifically, eNBs A, B, and C may transmit RSs for distance measurement on different subcarriers in the same subframe. A serving eNB may inform the UE of the frequency location of the RS of each eNB.

After performing the FFT on the received RSs, the UE may obtain the difference between the arrival time of the RS (e.g., the first signal) from each of eNBs A, B, and C and the FFT start time of the RS, for each of eNBs A, B, and C. Based on this, the UE additionally transmits to eNBs A, B, and C three RSs (e.g., third signals) to which phase difference values corresponding to Delta_1 of eNBs A, B, and C are additionally applied, together with ranging RSs (e.g., second signals).

To measure the distance from the UE, each eNB may perform the FFT based on its symbol boundary and detect phase information (e.g., third signal) about Delta_1 for each eNB.

The serving eNB may configure the UE with the frequency positions (e.g., subcarriers) of the RSs (e.g., third signals) for the phase information about Delta_1 assigned to eNBs A, B, and C.

The eNBs may not be perfectly synchronized. In addition, each eNB may transmit the ranging RS at a different times. In this case, the UE may perform the FFT separately for each eNB.

The UE may not transmit to the eNB the ranging RS and an RS for Delta_1 in the same subframe In the example of FIG. 4, since the third signal is transmitted in a narrow band, radio resources may be used more efficiently.

Figure 5:
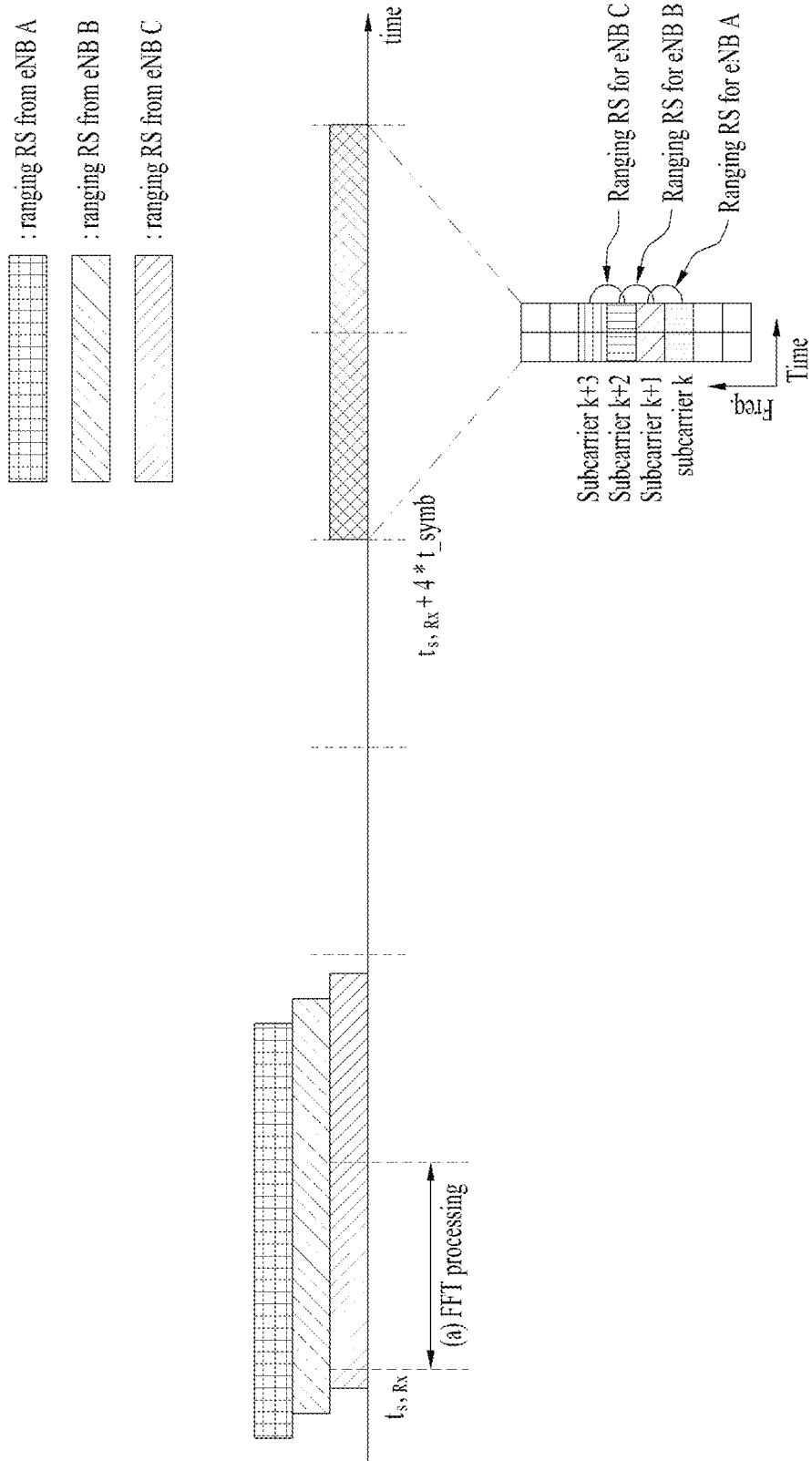
FIG. 5 is a diagram illustrating distance measurement between multiple cells and a UE according to another embodiment of the present disclosure.

FIG. 5 is a diagram illustrating distance measurement between multiple cells and a UE according to another embodiment of the present disclosure.

The UE may transmit phase difference information about Delta_1 for eNBs A, B, and C as shown in FIG. 5. For example, the UE sets the phase difference between a signal on subcarrier k and a signal on subcarrier k+1 to a phase difference corresponding to Delta_1 for eNB A. Then, the UE sets the phase difference between the signal on subcarrier k+1 and a signal on subcarrier k+2 to a phase difference corresponding to Delta_1 for eNB B. Finally, the UE sets the phase difference between the signal on subcarrier k+2 and a signal on subcarrier k+3 to a phase difference corresponding to Delta_1 for eNB C.

Accordingly, each eNB may obtain a phase difference between signals on two subcarriers assigned to each eNB and then calculate an RTT and a distance based on the phase difference.

The positions of the two subcarriers assigned to each eNB may be predefined by the network or configured for the UE. Alternatively, eNBs A, B, and C may also set the positions of the two subcarriers for each eNB through cooperation.

Figure 6:
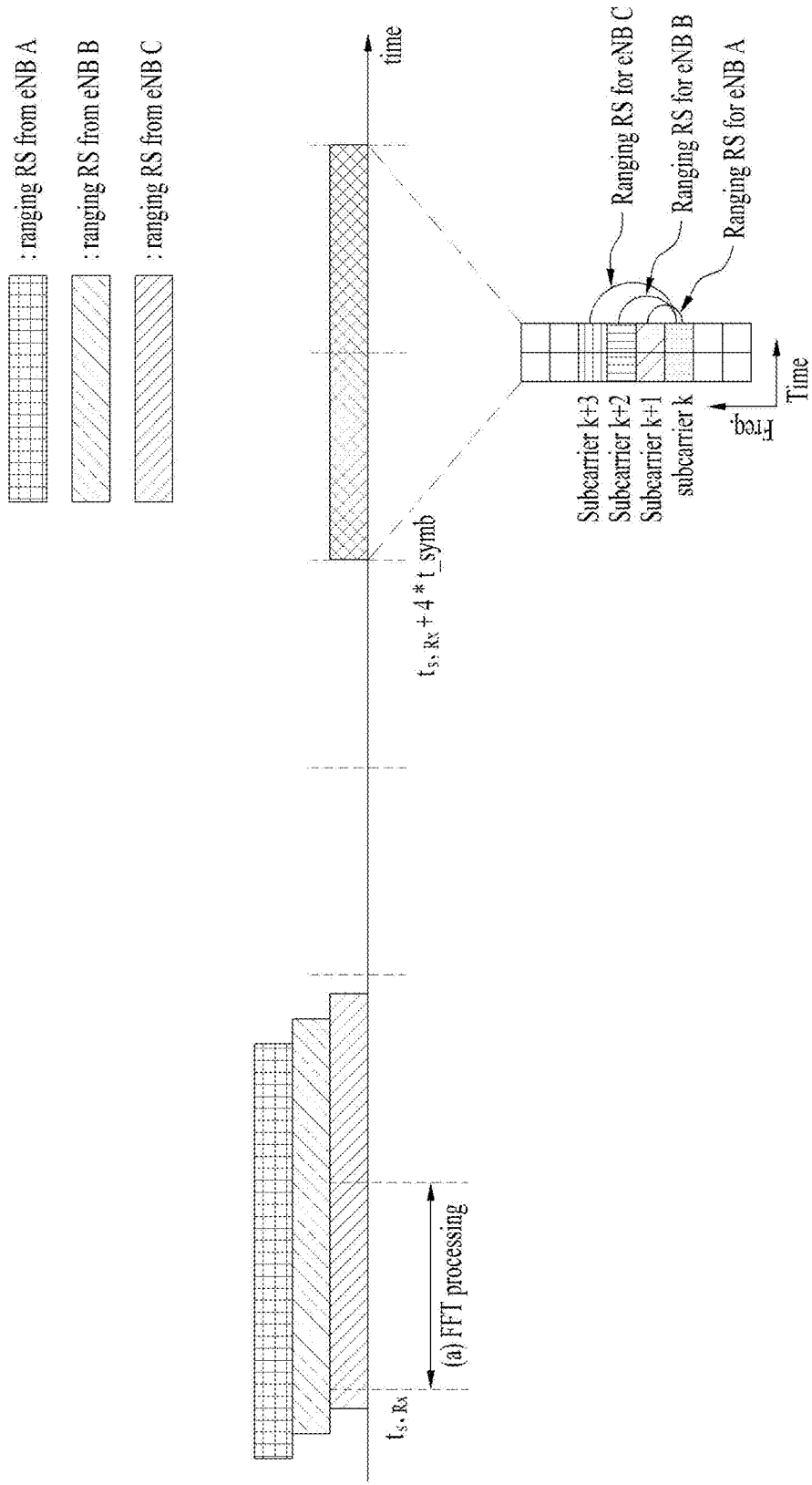
FIG. 6 is a diagram illustrating distance measurement between multiple cells and a UE according to a further embodiment of the present disclosure.

FIG. 6 is a diagram illustrating distance measurement between multiple cells and a UE according to a further embodiment of the present disclosure.

In FIG. 6, a phase difference corresponding to Delta_1 for each eNB is configured with respect to a signal on subcarrier k. Information about Delta_1 for eNB A is configured in a signal on subcarrier k+1, information about Delta_1 for eNB B is configured in a signal on subcarrier k+2, and information about Delta_1 for eNB C is configured in a signal on subcarrier k+3.

Referring to the example of FIG. 6, there is a trade-off that as the distance resolution for eNBs B and C decreases, the performance robustness against noise increases.

The SCS (i.e., frequency spacing) of a ranging RS and a signal carrying phase difference information about Delta_1 may vary depending on the maximum distance and distance resolution.

Example of Distance Measurement Between Multiple UEs

The above-described distance measurement methods may be applied to distance measurement between multiple UEs for device-to-device (D2D) or vehicle-to-vehicle (V2V) communication.

For example, it is assumed that UEs A, B, and C exist. UE A may broadcast a ranging RS (e.g., first signal) at a predefined time, and UEs B and C may calculate Delta_1_A from the ranging RS of UE A.

Thereafter, UE B may broadcast a ranging RS, and UEs A and C may calculate Delta_1_B. UE C may broadcast a ranging RS, and UEs A and B may calculate Delta_1_C.

UE A transmits RSs (e.g., third signals) for Delta_1_B and Delta_1_C measured by UE A together with ranging RSs (e.g., second signals). UE B and UE C also transmit second and third signals, similarly to UE A. By doing so, each of UEs A, B, and C may measure the distances to other UEs.

When the UEs are under the control of an eNB or when the UEs operate in coordination, ranging RSs (e.g., first signals) transmitted by UEs A, B, and C may be FDM in the same subframe. Then, ranging RSs (e.g., second signals) and RSs (e.g., third signals) for Delta_1 may be simultaneously transmitted in another subframe. In this case, the distance measurement may be performed based on the transmissions in the two subframes.

Example of Ranging RS Grouping

When the distance measurement is performed based on phase differences, the maximum ambiguity-free distance may increase as the frequency spacing between RSs decreases. However, performance degradation may occur due to phase estimation errors.

On the contrary, as the frequency spacing increases, robustness against the phase estimation errors may increase. However, the maximum distance may decrease. Thus, the frequency spacing between RSs for ranging needs to be appropriately selected.

When one eNB is to measure the distances to multiple UEs, the eNB may configure the frequency spacing (e.g., SCS) of a ranging RS transmitted from each UE by grouping the UEs. For example, assuming that there are a ranging RS with an SCS of 15 kHz (for group 1) and a ranging RS with an SCS of 30 kHz (for group 2), the eNB may configure the frequency spacing for each UE through RRC signaling or physical layer signaling. Each UE may transmit a ranging RS with a corresponding frequency spacing, and the eNB may configure resource multiplexing between the multiple UEs.

[Relative Map Construction]

Based on the above-described phase difference based distance measurement methods, the present disclosure proposes a method for each node to determine the relative positions of other nodes in an environment where there are multiple wireless nodes (e.g., UEs).

If a specific node knows the relative positions of nodes, it may be interpreted to mean that the specific node knows not only the distances from the specific node to other nodes but also the distances between the other nodes. Here, information about the relative positions may be referred to as a relative map.

Hereinafter, a transmission and reception procedure and a reception algorithm for each node to determine the relative positions will be described.

Figure 7:
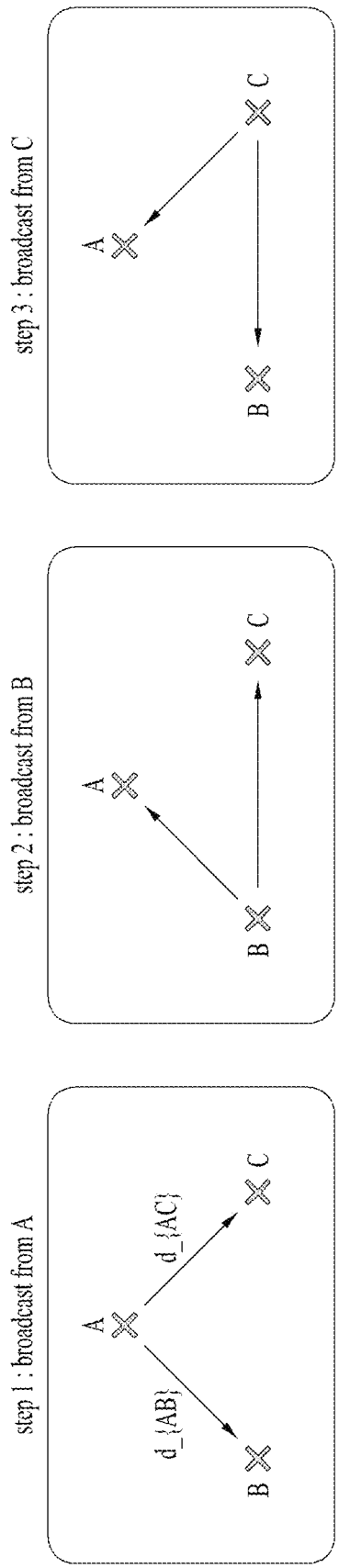
FIG. 7 is a diagram illustrating a procedure for configuring a relative map for multiple nodes according to an embodiment of the present disclosure.
Figure 8:
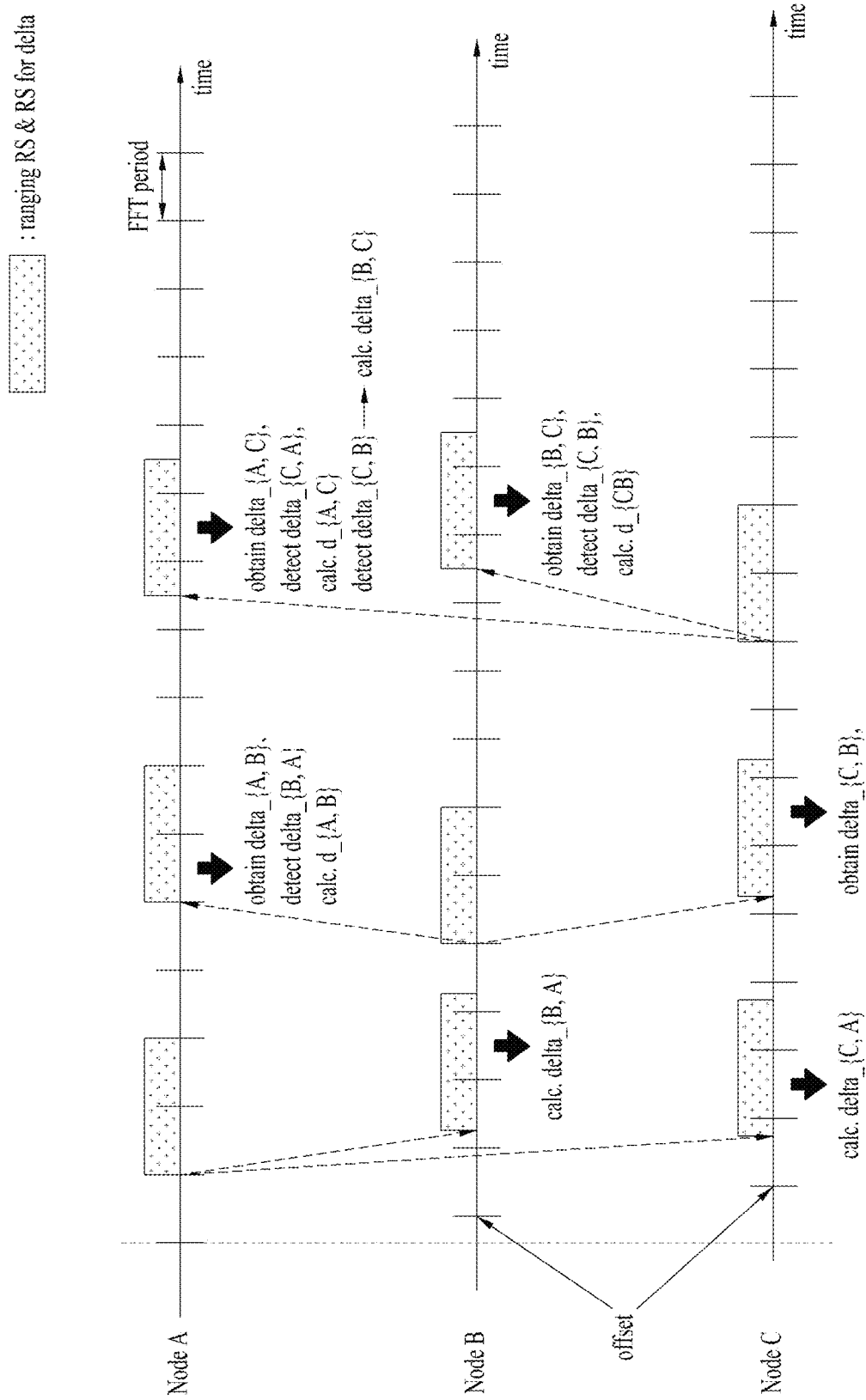
FIG. 8 illustrates signal transmission and reception between nodes A, B, and C illustrated in FIG. 7.

FIG. 7 is a diagram illustrating a procedure for configuring a relative map for multiple nodes according to an embodiment of the present disclosure. FIG. 8 illustrates signal transmission and reception between nodes A, B, and C illustrated in FIG. 7.

Although three nodes are illustrated for convenience, the present disclosure is applicable when three or more nodes exist. In addition, while each node transmits and receives based on its own clock time, the present disclosure is also applicable even when nodes are not synchronized.

It is assumed that each node has no distance information in an initial process. It is also assumed that the three nodes transmit ranging RSs and RSs carrying phase difference information in the following order: node A, node B, and node C. However, the present disclosure is not limited thereto.

STEP 1: Node A broadcasts ranging RS 1. Upon receiving the ranging RS from node A, node B and node C calculate phase differences based on their sampling times. The phase differences are defined as Delta_{B, A} and Delta_{C, A}, respectively. For example, node B calculates and stores Delta_{B, A}, and node C calculates and stores Delta_{C, A}.

STEP 2: Node B transmits an RS carrying information about Delta_{B, A} acquired in STEP 1 together with ranging RS 2 after M configured symbols or subframes. Node A may calculate and store Delta_{A, B} from ranging RS 2 and determine Delta_{B, A} from the RS received together with ranging RS 2. Thus, node A may know a distance d_{A, B} between node A and node B. Upon receiving the signals from node B, node C calculates Delta_{C, B} from ranging RS 2 and stores Delta_{C, B}.

STEP 3: Node C transmits information about Delta_{C, A} and Delta_{C, B} acquired in STEP 1/2 together with ranging RS 3 after N configured symbols or subframes. Node A may calculate Delta_{A, C} from ranging RS 3, store Delta_{A, C}, and determine d_{A, C} by detecting Delta_{C, A} received together with ranging RS 3. Further, node A may determine d_{B, C} by detecting (e.g., overhearing) Delta_{C, B} which is information transmitted from node C to node B. Node B may calculate Delta_{B, C} from ranging RS 3, store Delta_{B, C}, and determine d_{B, C} by detecting Delta_{C, B}, As described above, node A may determine not only the distance d_{A, B} between node A and node B and the distance d_{A, C} between node A and node C but also the distance d_{B, C} between node B and node C. In other words, node A may determine the lengths of all sides of a triangle obtained by connecting nodes A, B, and C. For example, node A may configure a relative map using the second law of cosines.

Hereinbelow, an exemplary algorithm by which node A obtains d_{B, C} through overhearing will be described in detail.

For example, node A may calculate d_{A, B} based on Example 2 and Equation 1 in STEP 2 of FIG. 7. Node A may estimate the start time of a relative FFT window of node B (e.g., an offset from the start time of an FFT window of node A) from d_{A, B}. For example, the relative start time of the FFT window of node B may be calculated according to Equation 7.

$$\text{Est\_offset\_fft\_NodeB (in radian)} = \text{delta}\_\{B,A\} + (d\_\{A,B\}/c)*2*\pi*\Delta f \quad \text{[Equation 7]}$$

In Equation 7, $\Delta f$ denotes a spacing between subcarriers (SCS).

In STEP 3, node A may estimate the start time of a relative FFT window of node C according to Equation 8 as in Equation 7.

$$\text{Est\_offset\_fft\_NodeC (in radian)} = \text{delta}\_\{C,A\} + (d\_\{A,C\}/c)*2*\pi*\Delta f \quad \text{[Equation 8]}$$

Node A may determine the relative offset of the FFT window of node B/C from Equation 7/8. Node A may calculate d_{B, C} from the relative offset of FFT window of node B/C and the previously overheard Delta_{C, B} according to Equation 9.

$$d\_\{B,C\} = (\text{Est\_offset\_fft\_NodeC} - \text{Est\_offset\_fft\_NodeB} - \text{delta}\_\{C,B\})*c/(2*\pi*\Delta f) \quad \text{[Equation 9]}$$

While the present example has been described on the assumption that the order in the initial process is node A, node B, and node C, the present disclosure is also applicable when the order changes. In addition, each node needs to transmit a ranging RS once and receive feedback information from all other nodes in order for all nodes to complete their relative maps. For example, the above-described process may be performed in the following order: node A, node B, node C, node A, and node B in order for all of nodes A, B, C to complete their relative maps.

The initial process for configuring the relative map has been described above. However, after the initial process, each node may transmit its own information, i.e., Delta information calculated from a ranging RS of another node, and thus, each node may update the relative map based on the delta information.

For example, it is assumed that there are four nodes A, B, C, and D and each node transmits a ranging RS once. Each node may obtain all Delta values based on ranging RSs transmitted from other nodes. Each node may transmit previously obtained Delta information when transmitting the ranging RS to other nodes. Other nodes may update their relative maps through distance measurement and overhearing.

For example, node B may transmit a signal carrying the ranging RS and information about Delta_{B, A}, Delta_{B, C}, and Delta_{B, D} at a predetermined time. Upon receiving the signal, each node may update the current relative map. Specifically, node A may calculate d_{A, B} again from Delta_{B, A} and the ranging RS. In addition, node A may calculate d_{B, C} and d_{B, D} again based on Delta_{B, C} and Delta_{B, D} obtained through overhearing. Similarly, node C may calculate d_{B, C} again from Delta_{B, C} and the ranging RS. In addition, node C may calculate d_{A, B} and d_{B, D} again based on Delta_{B, A} and Delta_{B, D} obtained through overhearing.

To configure the relative map, a resource configuration and activation/deactivation (or windowing) information need to be defined/configured. The resource configuration may include the transmission order/pattern of each node and the physical resource position of a signal carrying the ranging RS and Delta information of each node.

For example, an eNB may allocate to each node the position of a time/frequency resource, which is used by each node to transmit the ranging RS and Delta information, in a higher layer signal (e.g., RRC signal or broadcast signal). That is, each node may obtain its transmission time, reception time, and resource position from the corresponding information. The higher layer signal may also include the number of repetitions of transmission/reception. For example, assuming that the eNB allocates to a total of five nodes the positions of time/frequency resources for transmission/reception, each node may be allocated one of a total of five resources as its transmission resource. In this case, each node may perform reception on the remaining resources except its transmission resources among the five resources. In addition, the eNB may configure which node will use which reception resource. For example, assuming that the eNB determines that node 2 transmits on transmission resource 1, each node may know that the node uses the transmission resource. Further, each node may determine whether to transmit its own delta information based on the corresponding configuration information. Additionally, the eNB may configure the number of repetitions of the resources configured for the five nodes and the periodicity of the repetition.

On the other hand, the eNB may configure total transmission resource configuration information and the transmission time and repetition periodicity of each node, and then trigger transmission/reception through activation/deactivation. For example, after configuring resource configurations 1 to 7 and transmission periodicities, the eNB may indicate the start of transmission by triggering the activation and instruct all nodes to stop the transmission by triggering the deactivation. The activation/deactivation indication may be transmitted by a higher layer signal.

The eNB may reconfigure resources in a higher layer signal (e.g., RRC signal or broadcast signal).

It is assumed that there are one UE (e.g., vehicle) and a plurality of road side units (RSUs). If the UE already knows the absolute positions of three or more RSUs, the UE may transmit a request signal to an eNB to determine its absolute position. In response to the request from the UE, the eNB may configure the transmission time of a ranging RS at the UE and the response at each RSU. The UE may calculate the distance between the UE and each RSU from ranging RSs and Delta information from three RSUs and then determine the absolute position of the UE.

The resources for the RSUs and UE may be preconfigured semi-statically.

The eNB may efficiently control interference through the relative map of the UE in an environment such as full duplex radio or UE-specific dynamic time division duplex (TDD).

Figure 9:
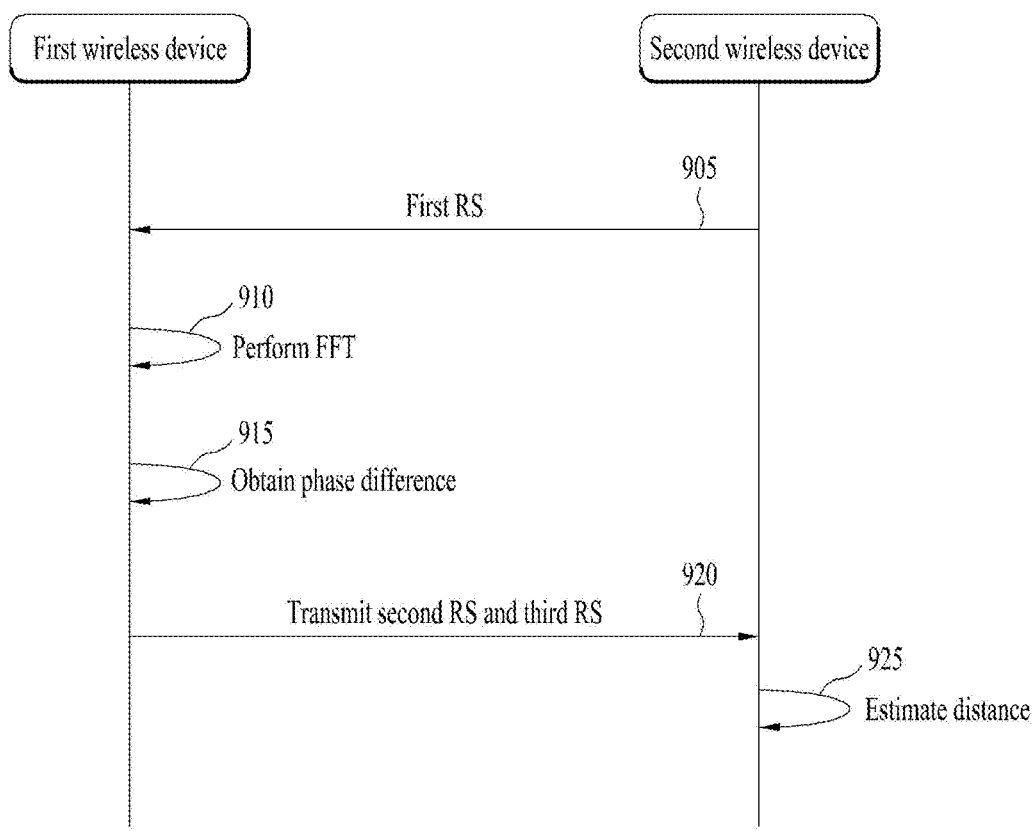
FIG. 9 is a flowchart illustrating a method of transmitting and receiving a reference signal for distance measurement according to an embodiment of the present disclosure.

FIG. 9 is a flowchart illustrating a method of transmitting and receiving an RS for distance measurement according to an embodiment of the present disclosure. A redundant description will be omitted for clarity. Although two wireless devices are illustrated for convenience, it will be understood by those skilled in the art that more wireless devices may exist.

Referring to FIG. 9, a first wireless device may receive from a second wireless device a first RS including a first sinusoidal signal having a first angular frequency and a first initial phase value and a second sinusoidal signal having a second angular frequency and a second initial phase value (905).

The first and second sinusoidal signals may correspond to $x_1(t)=\alpha_1 * e^{j*(w1*t+\beta1)}$ and $x_2(t)=\alpha_2 * e^{j*(w2*t+\beta2)}$, respectively, where t denotes a time, $\alpha_1$ denotes the amplitude of the first sinusoidal signal, $\alpha_2$ denotes the amplitude of the second sinusoidal signal, $w_1$ denotes the first angular frequency, $w_2$ denotes the second angular frequency, $\beta_1$ denotes the first initial phase value, and $\beta_2$ denotes the second initial phase value.

The first wireless device may perform the FFT on the first RS (910).

The first wireless device may obtain a phase difference between the first and second sinusoidal signals based on the result of the FFT (915).

For example, the first wireless device may obtain the phase difference by considering the first initial phase value of the first sinusoidal signal and the second initial phase value of the second sinusoidal signal. The phase difference may be calculated according to Equation 1. When Equation 1 is applied to the present embodiment, the terms in Equation 1 may be defined as follows: $t_{s,RX}$ denotes a time at which the FFT of the first RS starts, $t_{a,RX}$ denotes a time at which the first RS arrives at the first wireless device, $w_1$ denotes the first angular frequency, $w_2$ denotes the second angular frequency, $X_{RX}(w_1)$ denotes the FFT result of the first sinusoidal signal, and $X_{RX}(w_2)$ denotes the FFT result of the second sinusoidal signal. The phase difference calculated according to Equation 1, $\Psi$ may be as follows: $\Psi=(w_2-w_1)(t_{s,RX}-t_{a,RX})+(\beta_2-\beta_1)$.

For example, the first wireless device may correct the phase difference $\Psi$ to $\theta$ based on the first and second initial phase values. The corrected phase difference $\theta$ may be as follows: $\theta=\Psi-(\beta_2-\beta_1)$.

The first wireless device may transmit a second RS for distance measurement and a third RS including information about the corrected phase difference to the second wireless device (920). The phase of the third RS may have an offset as large as the corrected phase difference from the phase of the second RS. The third RS may include a sinusoid defined as: $x_{k+2}(t)=\alpha_{k+2}*\exp(j*(2\pi*f_{k+2}*t+\beta_{k+2}+\theta))$, where k+2 denotes the index of a subcarrier on which the sinusoid $x_{k+2}(t)$ is transmitted, t denotes a time, $\alpha_{k+2}$ denotes the amplitude of the sinusoid $x_{k+2}(t)$, $w_{k+2}$ denotes the angular frequency of the sinusoid $x_{k+2}(t)$, and $\beta_{k+2}$ denotes the initial phase value of the sinusoid $x_{k+2}(t)$.

The second wireless device may estimate the distance between the first and the second wireless devices based on the information about the phase difference (925). For example, the distance between the first and the second wireless devices may be calculated according to Equation 6. When Equation 6 is applied to the present embodiment, the terms in Equation 6 may be defined as follows: d denotes the distance between the first and second wireless devices, c denotes the speed of light, $t_{symb}$ denotes one symbol length, θ denotes the corrected phase difference, Δf denotes the SCS between the second and third RSs, and delta$_2$ denotes the difference between a time at which the second RS arrives at the second wireless device and a time at which the FFT is performed on the second RS.

Further, delta$_2$ may correspond to $t_{s,Tx}+(n+1)*t\_symb-t_{a,Tx}$, where $t_{s,Tx}$ denotes a time at which the first RS is transmitted by the second wireless device, $t_{a,Tx}$ denotes the time at which the second RS arrives at the second wireless device, and n denotes the number of symbols between the first and second RSs.

The process for exchanging the first, second, and third RSs may be performed alternately by multiple wireless devices including not only the first and second wireless devices but a third wireless device.

The first wireless device may estimate the distance between the second and third wireless devices by overhearing information about a phase difference transmitted from the third wireless device to the second wireless device.

FIG. 10 is a block diagram illustrating the configurations of a transmission device 105 and a reception device 110 in a wireless communication system 100 according to an embodiment of the present disclosure. For convenience, while it is assumed that the transmission device is a base station (BS) and the reception device is a terminal, the present disclosure is not limited thereto, and each of the transmission device and the reception device may be interpreted as any wireless node.

The BS may also be referred to as an eNB or gNB. The terminal may be referred to as a UE.

Although one transmission device 105 and one reception device 110 are shown to simplify the wireless communication system 100, the wireless communication system 100 may include one or more transmission devices and/or one or more reception devices.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present disclosure support a multiple input multiple output (MIMO) system. The BS 105 according to the present disclosure can support both a single user-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a time division multiplexing (TDM) symbol, or a code division multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS can be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present disclosure may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present disclosure may be implemented in the form of modules, procedures, functions, etc. which perform the above-described functions or operations. Firmware or software implemented in the present disclosure may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A radio resource control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the disclosure. Thus, it is intended that the present disclosure covers the modifications and variations of this disclosure that come within the scope of the appended claims and their equivalents.

INDUSTRIAL APPLICABILITY

As described above, the present disclosure may be applied to various wireless communication systems.

The invention claimed is:

1. A method of receiving a reference signal for distance measurement by a first wireless device in a wireless communication system, the method comprising:
   receiving a first reference signal including a first sinusoidal signal and a second sinusoidal signal from a second wireless device, wherein the first sinusoidal signal has a first angular frequency and a first initial phase value, and wherein the second sinusoidal signal has a second angular frequency and a second initial phase value;
   obtaining a phase difference between the first and second sinusoidal signals based on a fast Fourier transform (FFT) of the first reference signal;
   correcting the phase difference based on the first and second initial phase values; and
   transmitting a second reference signal including sinusoidal signals, each having a different angular frequency, for distance measurement and a third reference signal including information about the corrected phase difference to the second wireless device,
   wherein the first and second sinusoidal signals are $x_1(t)=\alpha_1 * e^{j*(w1*t+\beta 1)}$ and $x_2(t)=\alpha_2 * e^{j*(w2*t+\beta 2)}$, respectively, where t denotes a time, $\alpha_1$ denotes an amplitude of the first sinusoidal signal, $\alpha_2$ denotes an amplitude of the second sinusoidal signal, $w_1$ denotes the first angular frequency, $w_2$ denotes the second angular frequency, $\beta_1$ denotes the first initial phase value, and $\beta_2$ denotes the second initial phase value.

2. The method of claim 1, wherein the phase difference is calculated based on Equation A:

$$\frac{X_{RX}(w_2)}{X_{RX}(w_1)} = \frac{\alpha_2}{\alpha_1} * e^{j*\{(w_2-w_1)(t_{s,RX}-t_{a,RX})+(\beta_2-\beta_1)\}}, \quad [\text{Equation A}]$$

where $t_{s,RX}$ denotes a time at which the FFT of the first reference signal starts, $t_{a,RX}$ denotes a time at which the first reference signal arrives at the first wireless device, $X_{RX}(w_1)$ denotes an FFT result of the first sinusoidal signal, and $X_{RX}(w_2)$ denotes an FFT result of the second sinusoidal signal.

3. The method of claim 2, wherein the phase difference calculated based on Equation A is $\Psi=(w_2-w_1)(t_{s,RX}-t_{a,RX})+(\beta_2-\beta_1)$, and wherein the corrected phase difference is $\theta=\Psi-(\beta_2-\beta_1)$.

4. The method of claim 1, wherein a phase of the third reference signal has an offset from a phase of the second reference signal, and
   wherein the offset is equivalent to the corrected phase difference.

5. The method of claim 4, wherein the third reference signal includes a sinusoid defined as: $x_{k+2}(t)=\alpha_{k+2}*\exp(j*(2\pi*f_{k+2}*t+\beta_{k+2}+\theta))$, where k+2 denotes an index of a subcarrier on which the sinusoid $x_{k+2}(t)$ is transmitted, t denotes a time, $\alpha_{k+2}$ denotes an amplitude of the sinusoid $x_{k+2}(t)$, $w_{k+2}$ denotes an angular frequency of the sinusoid $x_{k+2}(t)$, $\beta_{k+2}$ denotes an initial phase value of the sinusoid $x_{k+2}(t)$, and $\theta$ denotes the corrected phase difference.

6. The method of claim 1, wherein a distance between the first and second wireless devices is calculated based on Equation B:

$$d = \frac{c}{2}\left(t_{symb} - \frac{\theta}{2\pi * \Delta f} - \text{delta}_2\right),$$ [Equation B]

where d denotes the distance between the first and second wireless devices, c denotes a speed of light, $t_{symb}$ denotes one symbol length, θ denotes the corrected phase difference, Δf denotes a subcarrier spacing between the second and third reference signals, and delta$_2$ denotes a difference between a time at which the second reference signal arrives at the second wireless device and a time at which the FFT is performed on the second reference signal.

7. The method of claim 6, wherein delta$_2$ is calculated based on Equation C:

$$\text{delta}_2 = t_{s,Tx} + (n+1)*t\_\text{symb} - t_{a,Tx},$$ [Equation C]

where $t_{s,Tx}$ denotes the time at which the FFT of the second reference signal starts, $t_{a,Tx}$ denotes the time at which the second reference signal arrives at the second wireless device, and n denotes a number of symbols between the first and second reference signals.

8. A method of transmitting a reference signal for distance measurement to a first wireless device by a second wireless device in a wireless communication system, the method comprising:
   transmitting a first reference signal including a first sinusoidal signal and a second sinusoidal signal to the first wireless device, wherein the first sinusoidal signal has a first angular frequency and a first initial phase value, and wherein the second sinusoidal signal has a second angular frequency and a second initial phase value;
   receiving a second reference signal including sinusoidal signals, each having a different angular frequency, for distance measurement and a third reference signal including information about a corrected phase difference from the first wireless device; and
   estimating a distance between the first and second wireless devices based on the information about the corrected phase difference,
   wherein the information about the corrected phase difference includes a phase difference between the first and second sinusoidal signals corrected by the first wireless device in consideration of the first and second initial phase values after receipt of the first reference signal,
   wherein the first and second sinusoidal signals are $x_1(t)=\alpha_1 * e^{j*(w1*t+\beta 1)}$ and $x_2(t)=\alpha_2 * e^{j*(w2*t+\beta 2)}$, respectively, where t denotes a time, $\alpha_1$ denotes an amplitude of the first sinusoidal signal, $\mu_2$ denotes an amplitude of the second sinusoidal signal, $w_1$ denotes the first angular frequency, $w_2$ denotes the second angular frequency, $\beta_1$ denotes the first initial phase value, and $\beta_2$ denotes the second initial phase value.

9. The method of claim 8, wherein the corrected phase difference corresponds to $\theta=(w_2-w_1)(t_{s,RX}-t_{a,RX})$, where $t_{s,RX}$ denotes a time at which the first wireless device starts a fast Fourier transform (FFT) of the first reference signal, and $t_{a,RX}$ denotes a time at which the first reference signal arrives at the first wireless device.

10. The method of claim 8,
    wherein a phase of the third reference signal has an offset from a phase of the second reference signal, and
    wherein the offset is equivalent to the corrected phase difference.

11. The method of claim 8, wherein a distance between the first and second wireless devices is calculated based on Equation B:

$$d = \frac{c}{2}\left(t_{symb} - \frac{\theta}{2\pi * \Delta f} - \text{delta}_2\right),$$ [Equation B]

where d denotes the distance between the first and second wireless devices, c denotes a speed of light, $t_{symb}$ denotes one symbol length, θ denotes the corrected phase difference, Δf denotes a subcarrier spacing between the second and third reference signals, and delta$_2$ denotes a difference between a time at which the second reference signal arrives at the second wireless device and a time at which a fast Fourier transform (FFT) is performed on the second reference signal.

12. The method of claim 11, wherein delta$_2$ is calculated based on Equation C:

$$\text{delta}_2 = t_{s,Tx} + (n+1)*t\_\text{symb} - t_{a,Tx},$$ [Equation C]

where $t_{s,Tx}$ denotes the time at which the FFT of the second reference signal starts, $t_{a,Tx}$ denotes the time at which the second reference signal arrives at the second wireless device, and n denotes a number of symbols between the first and second reference signals.

13. A first wireless device for receiving a reference signal for distance measurement in a wireless communication system, the first wireless device comprising:
   a transceiver; and
   a processor configured to:
   control the transceiver to receive a first reference signal including a first sinusoidal signal and a second sinusoidal signal from a second wireless device, wherein the first sinusoidal signal has a first angular frequency and a first initial phase value, and wherein the second sinusoidal signal has a second angular frequency and a second initial phase value;
   obtain a phase difference between the first and second sinusoidal signals based on a fast Fourier transform (FFT) of the first reference signal;
   correct the phase difference based on the first and second initial phase values; and
   transmit a second reference signal including sinusoidal signals, each having a different angular frequency, for distance measurement and a third reference signal including information about the corrected phase difference to the second wireless device,
   wherein the first and second sinusoidal signals are $x_1(t)=\alpha_1 * e^{j*(w1*t+\beta 1)}$ and $x_2(t)=\alpha_2 * e^{j*(w2*t+\beta 2)}$, respectively, where t denotes a time, $\alpha_1$ denotes an amplitude of the first sinusoidal signal, $\alpha_2$ denotes an amplitude of the second sinusoidal signal, $w_1$ denotes the first angular frequency, $w_2$ denotes the second angular frequency, $\beta_1$ denotes the first initial phase value, and $\beta_2$ denotes the second initial phase value.

* * * * *